United States Patent
Rossler (10) Patent No.: US 12,044,334 B2
(45) Date of Patent: Jul. 23, 2024

(54) TUNER FOR USE WITH A TORQUE CONVERTER

(71) Applicant: Carl W. Rossler, McDonald, OH (US)

(72) Inventor: Carl W. Rossler, McDonald, OH (US)

( * ) Notice: Subject to any disclaimer, the term of this patent is extended or adjusted under 35 U.S.C. 154(b) by 1101 days.

(21) Appl. No.: 16/853,802

(22) Filed: Apr. 21, 2020

(65) Prior Publication Data

US 2020/0332903 A1 Oct. 22, 2020

Related U.S. Application Data

(60) Provisional application No. 62/836,925, filed on Apr. 22, 2019.

(51) Int. Cl.
| | |
|---|---|
| *F16K 5/04* | (2006.01) |
| *F16H 41/24* | (2006.01) |
| *F16K 5/10* | (2006.01) |
| *F16K 31/60* | (2006.01) |
| *G05D 16/04* | (2006.01) |

(52) U.S. Cl.
CPC ............ *F16K 5/10* (2013.01); *F16H 41/24* (2013.01); *F16K 5/0414* (2013.01); *F16K 31/60* (2013.01); *G05D 16/04* (2013.01)

(58) Field of Classification Search
CPC ... F16K 5/10; F16K 5/12; F16K 31/60; F16K 5/0414; F16H 41/24; F16H 61/068; F16H 2061/0065
USPC .................................................. 251/205–209
See application file for complete search history.

(56) References Cited

U.S. PATENT DOCUMENTS

| | | | | |
|---|---|---|---|---|
| 717,688 | A * | 1/1903 | Kerns ................... | E03C 1/057 251/207 |
| 1,015,164 | A * | 1/1912 | Fowden ............... | F16K 37/0008 251/286 |
| 1,088,103 | A * | 2/1914 | Schreidt ............. | F16K 37/0008 137/553 |
| 2,062,896 | A * | 12/1936 | Martocello ............ | F16K 24/06 251/207 |
| 2,101,356 | A * | 12/1937 | William ................. | F16K 5/10 251/207 |
| 2,701,704 | A * | 2/1955 | Lawrence ............... | F16K 21/16 251/207 |
| 2,951,501 | A * | 9/1960 | Thylefors ............ | G05D 7/0126 251/207 |
| 2,986,161 | A * | 5/1961 | Renick ............... | F15B 13/0417 251/215 |
| 3,139,903 | A * | 7/1964 | Lonn ..................... | F25B 41/335 251/207 |
| 7,104,273 | B1 * | 9/2006 | Stafford ................. | F16H 61/14 137/454.2 |

* cited by examiner

*Primary Examiner* — Marina A Tietjen
(74) *Attorney, Agent, or Firm* — Dureska & Moore, LLC; Brent L. Moore; Benjamin J. Chojnacki

(57) ABSTRACT

A step-adjustment mechanism for use in a hydraulic pressure adjustment block of a transmission, the step-adjustment mechanism including at least one opening. The opening is in fluid communication with the transmission and a torque converter. The step-adjustment mechanism has a first and second position to selectively restrict fluid flow between the transmission and the torque converter.

14 Claims, 7 Drawing Sheets

TUNER FOR USE WITH A TORQUE CONVERTER

CROSS-REFERENCE TO RELATED APPLICATION

This application claims the benefit of U.S. Provisional Patent Application No. 62/836,925, filed Apr. 22, 2019.

BACKGROUND OF THE INVENTION

Field of the Invention

The present invention relates generally to the art of transmissions for high-performance vehicles. More particularly, the present invention relates to high-performance vehicle automatic transmission torque converters utilizing hydraulic pressure relief mechanisms. In particular, the present invention is directed to a variable hydraulic pressure step-adjustment mechanism, or tuner, which allows for easy step adjustment of the pressure relief mechanism that is in fluid communication with the torque converter without requiring exchange or removal of the step-adjustment mechanism from the pressure step-adjustment block, thereby allowing for relatively faster, easier, and safer adjustment of the amount of fluid being released from the torque converter.

Background Art

Transmissions are well-known in the art of high-end and racing vehicles. In particular, vehicles for drag racing utilize extensively modified automatic transmissions. Automatic transmissions typically include a number of components, such as a housing, a torque converter, a gearbox, and a valve body. The housing is generally filled with hydraulic fluid that provides a means of powering, lubricating, and cooling the components of the transmission. Valving is required to control the pressure of hydraulic fluid within and supplied to the various components of the transmission.

For drag racing vehicles, the performance of the torque converter can be a critical factor in determining the outcome of a competition. In particular, the torque converter creates a fluid link between an engine of the vehicle and the transmission. The torque converter generally includes an impeller, a turbine, and a multiplier or stator. The engine of the vehicle is mechanically connected to the impeller of the torque converter. Power from the engine turns the impeller, which moves the hydraulic fluid within the torque converter toward the turbine, generating fluid pressure. Fluid movement within the torque converter moves the turbine, generating torque and flow toward the impeller and stator. The stator redirects the flow of fluid toward the impeller, multiplying the torque. As fluid pressure increases in the torque converter, the transmission engages, powering a driveshaft, which allows the vehicle to move.

The stall speed of the torque converter is of particular importance in drag racing. Specifically, the stall speed of a torque converter is the engine speed at which the torque converter transfers the engine power to the transmission. For drag racing, it is generally desirable to have a very high stall speed that is matched to peak output of the engine to allow the vehicle to launch quickly from the starting line. In addition, it is generally desirable to be able to alter the stall speed after launch to generate controlled slip between the engine and the torque converter to optimize torque converter performance for various track conditions. However, fluid pressure within the torque converter can potentially adversely affect the stall speed of the torque converter. More particularly, as fluid pressure builds within the torque converter, the fluid pressure creates resistance for the impeller, limiting the engine speed. As a result, the launching vehicle may have suboptimal burnout, acceleration, and torque. Thus, there are typically very tight tolerances for controlling the pressure within the torque converter in order to optimize performance. In addition, modulation and regulation of the pressure within the torque converter can be made difficult as changes to the engine, torque converter, or environmental conditions can also potentially alter the stall speed.

In order to modulate the pressure within, and optimize the performance of, the torque converter, automatic transmissions for drag racing vehicles have included a dump valve or pressure relief mechanism. The pressure relief mechanism is typically attached to the housing of the transmission and assists in pressure modulation of the torque converter by providing selective fluid communication between a turbine-side of the torque converter and the rest of the transmission. More particularly, the pressure relief mechanism includes a solenoid and one or more prior art output valves. The solenoid acts to selectively block fluid flow through the prior art output valves.

The prior art output valves are generally cylindrical and partially hollow or tubular with a central opening formed away from an end of the output valve, along a longitudinal central axis, and up to or past a midpoint of the output valve. An opening is formed perpendicular to, and in fluid communication with, the central opening of the output valve and has any suitable predetermined orifice size. The opening is sized to modulate flow through the prior art output valve, thereby modulating or reducing the pressure within the torque converter. The prior art output valve is generally removably disposed within the pressure relief mechanism and may be exchanged for, or replaced with, a different prior art output valve having a different predetermined orifice size in order to adjust and optimize the pressure within the torque converter.

During operation of the vehicle, power is supplied by the engine to the torque converter of the transmission. The torque converter converts the energy from the engine into torque and generates fluid pressure, which engages the transmission and driveshaft. The pressurized hydraulic fluid flows from the turbine-side of the torque converter through an exhaust port to the pressure relief mechanism. The prior art pressure relief mechanism allows the pressurized fluid to flow back into the transmission in order to relieve the pressure within the torque converter. The size of the opening of the prior art output valve determines the amount of flow through the pressure relief mechanism. Specifically, the pressure relief mechanism selectively builds or relieves pressure behind the turbine of the torque converter by allowing fluid flow through the prior art output valve, which reduces pressure in the torque converter and, in turn, decreases fluid resistance to impeller movement, thereby increasing stall speed.

Prior art output valves, while operating adequately within the pressure relief mechanism, have certain disadvantages, drawbacks, and limitations. For example, prior art output valves each have a single opening of a predetermined size, which must be selected and installed prior to each drag race in which the vehicle participates. However, because the fluid pressure in the torque converter must be tightly controlled and is sensitive to a number of factors, including weather and track conditions, the selected prior art output valve and corresponding opening size may result in suboptimal performance. In addition, the vehicle typically performs test runs to assist in selection of an appropriate opening size. These test runs heat up the transmission and associated components. As a result, exchanging or replacing the prior art output valve to optimize the performance of the torque converter can be very labor intensive, time consuming, and potentially harmful to a technician performing the maintenance.

Thus, there is a need for a hydraulic pressure relief output valve that provides improved optimization of torque converter performance without requiring exchange or replacement of the output valve in order to alter the opening size, thereby increasing safety and decreasing the amount of time and labor spent in optimizing the torque converter. The hydraulic pressure step-adjustment mechanism, according to the present invention, satisfies this need and overcomes the disadvantages, drawbacks, and limitations of prior art output valves by providing a step-adjustment valve that is selectively adjustable between a number of stepped opening sizes, which allows the technician to easily and quickly change the opening size without removing the step-adjustment mechanism from the hydraulic pressure step-adjustment block, thereby increasing the safety and speed with which changing the opening size occurs.

SUMMARY OF THE INVENTION

Objectives of the present invention include providing a step-adjustment mechanism for use in a hydraulic pressure adjustment block of a transmission that improves torque converter optimization, increases safety, and decreases time and labor spent optimizing the torque converter.

A further objective of the present invention is to provide a step-adjustment mechanism for use in a hydraulic pressure adjustment block of a transmission that does not require exchange or replacement to alter the opening size of the step adjustment mechanism.

These objectives and advantages are obtained by the step-adjustment mechanism for use in a hydraulic pressure adjustment block of a transmission and including at least one opening. The opening is in fluid communication with the transmission and a torque converter. The step-adjustment mechanism has a first position and a second position to selectively restrict fluid flow between the transmission and the torque converter via the at least one opening.

BRIEF DESCRIPTION OF THE SEVERAL VIEWS OF THE DRAWINGS

The preferred embodiment of the present invention, illustrative of the best mode in which Applicant has contemplated applying the principles, is set forth in the following description, shown in the drawings, and particularly and distinctly pointed out and set forth in the appended claims.

Similar reference characters refer to similar parts throughout.

DESCRIPTION OF THE PREFERRED EMBODIMENT

A hydraulic pressure step-adjustment block 10 for use with an exemplary embodiment hydraulic pressure step-adjustment mechanism 60, according to the present invention, is shown in FIGS. 1-5. Pressure step-adjustment block 10 includes a body 12 with an exterior-facing side 18, a transmission-facing side 17 (FIG. 2), and a flange 14 extending radially outward from the body. Flange 14 is formed with a plurality of openings 16 for receiving a plurality of fasteners (not shown). The fasteners typically attach body 12 to a housing (not shown) of a transmission (not shown) of a vehicle (not shown), such that the transmission-facing side 17 is oriented against an opening (not shown) in the transmission housing.

Body 12 is formed from any suitable rigid material, such as aluminum or steel, by any suitable process, such as milling, casting, or the like. Body 12 is formed with a main chamber 20, a solenoid port 30, a first adjustment port 32, a second adjustment port 38, an inlet port 34, and a relief port 36. Main chamber 20 has a generally stepped cylindrical shape with a longitudinal central axis A. An inner dimension or diameter (not shown) of main chamber 20 generally narrows as the main chamber extends along longitudinal central axis A from solenoid port 30 toward first adjustment port 32. A first valve passage 22 extends from first adjustment port 32 along longitudinal central axis A. First valve passage 22 is arranged concentrically to main chamber 20 and provides fluid communication between the main chamber and first adjustment port 32. First adjustment port 32 provides fluid communication between first valve passage 22 and the transmission housing.

A solenoid 50 (FIG. 1) is removably disposed within solenoid port 30. Solenoid 50 is electrically powered and may be connected to and controlled by a remote actuation mechanism or an automated mechanical or electrical means, such as a control unit, as is known. Solenoid 50 is normally actuated such that, without electrical current applied, a solenoid pin (not shown) extends from a solenoid housing 52 into main chamber 20. The pin blocks first valve passage 22, thereby preventing fluid communication between main chamber 22 and first adjustment valve port 32. Electrical actuation of solenoid 50 causes the pin to retract into solenoid housing 52, allowing fluid communication between main chamber 20 and first adjustment port 32.

Pressure step-adjustment block 10 also includes an inlet passage 24 providing fluid communication between main chamber 20 and inlet port 34. Inlet passage 24 extends from inlet port 34 perpendicularly to longitudinal central axis A of main chamber 20 and obliquely to the plane in which the longitudinal central axis is embedded, such that the inlet passage extends toward the transmission-facing side 17 of housing 12. A sensor 58 (FIG. 1), such as a pressure gauge, may be operatively connected to inlet passage 24 via an auxiliary port 48 to monitor conditions within the inlet port and main chamber 20. Inlet port 34 fixedly or removable connects to an end of an inlet hose or conduit (not shown). An opposite end of the inlet conduit is connected to an exhaust port (not shown) located on the transmission housing adjacent a turbine side of the torque converter. The inlet conduit provides fluid communication between the torque converter and inlet port 34, and, thus, between the torque converter and main chamber 20 of pressure step-adjustment block 10. As a result, fluid within the torque converter may be transferred to the main chamber 20.

Pressure step-adjustment block 10 has a blow-off or relief passage 26, which extends from relief port 36 perpendicular to, and in fluid communication with, main chamber 20. A blow-off or relief assembly 56 (FIG. 1) is removably disposed within relief port 36 to allow release of pressurized fluid from main chamber 20 through an exhaust port 27 if the pressure within the main chamber exceeds a predetermined set amount. As a result, relief assembly 56 prevents overpressurization of the torque converter, thereby preventing damage to the transmission. It is further contemplated that relief assembly 56 may be adjustable or may include hydraulic pressure step-adjustment mechanism 60, or the like. Alternatively, pressure step-adjustment block 10 may not include relief passage 26 and relief port 36. A second valve passage 28 extends from second adjustment port 38 and provides fluid communication between relief passage 26 and the second adjustment port. Second adjustment port 38 provides fluid communication between second valve passage 28 and the transmission housing.

Figure 1:
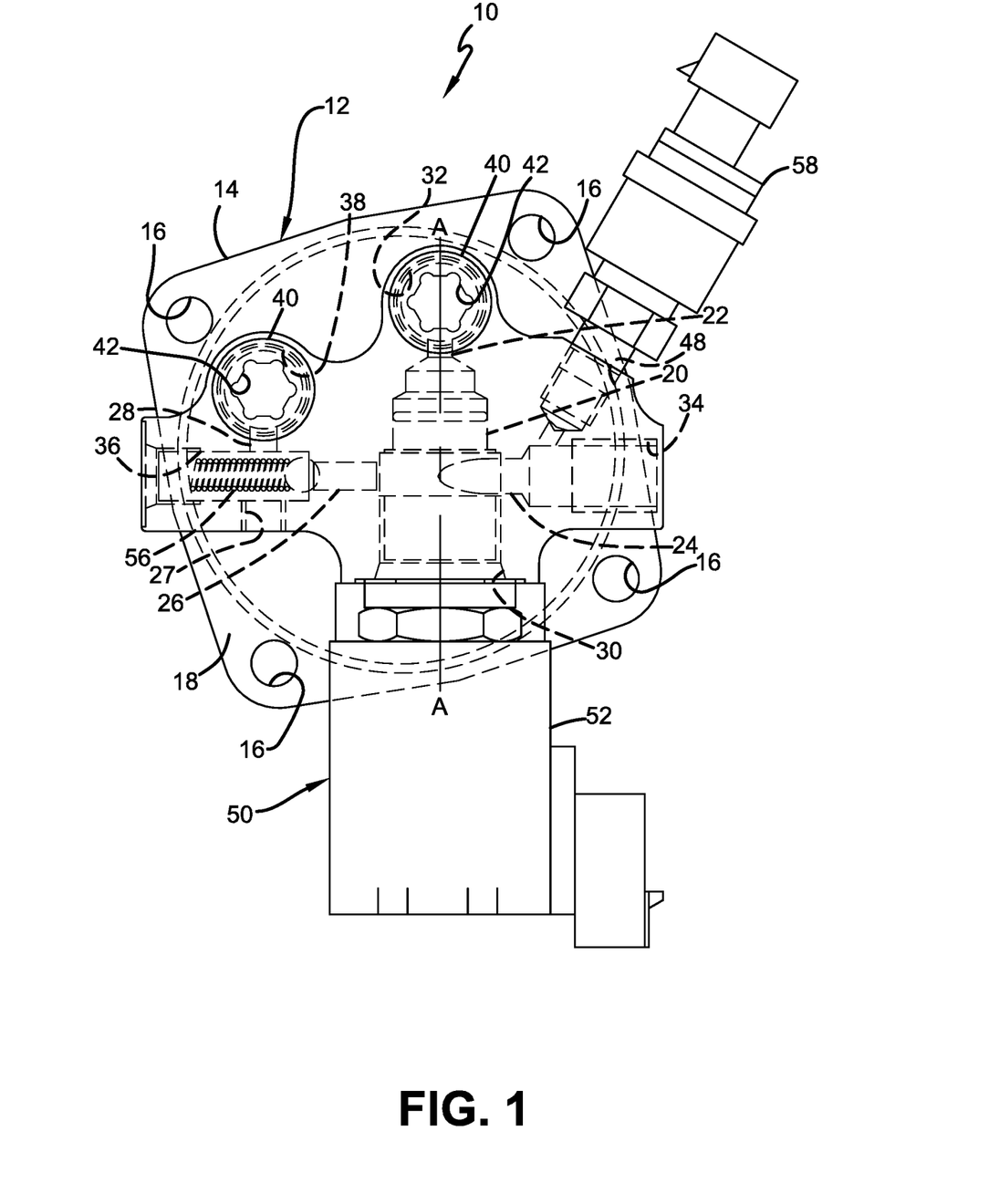
FIG. 1 is a front elevational view, with hidden portions shown in broken lines, of a hydraulic pressure step-adjustment block for use with a hydraulic pressure step-adjustment mechanism of the present invention, showing a solenoid valve and a sensor operatively connected to the pressure step-adjustment block.
Figure 2:
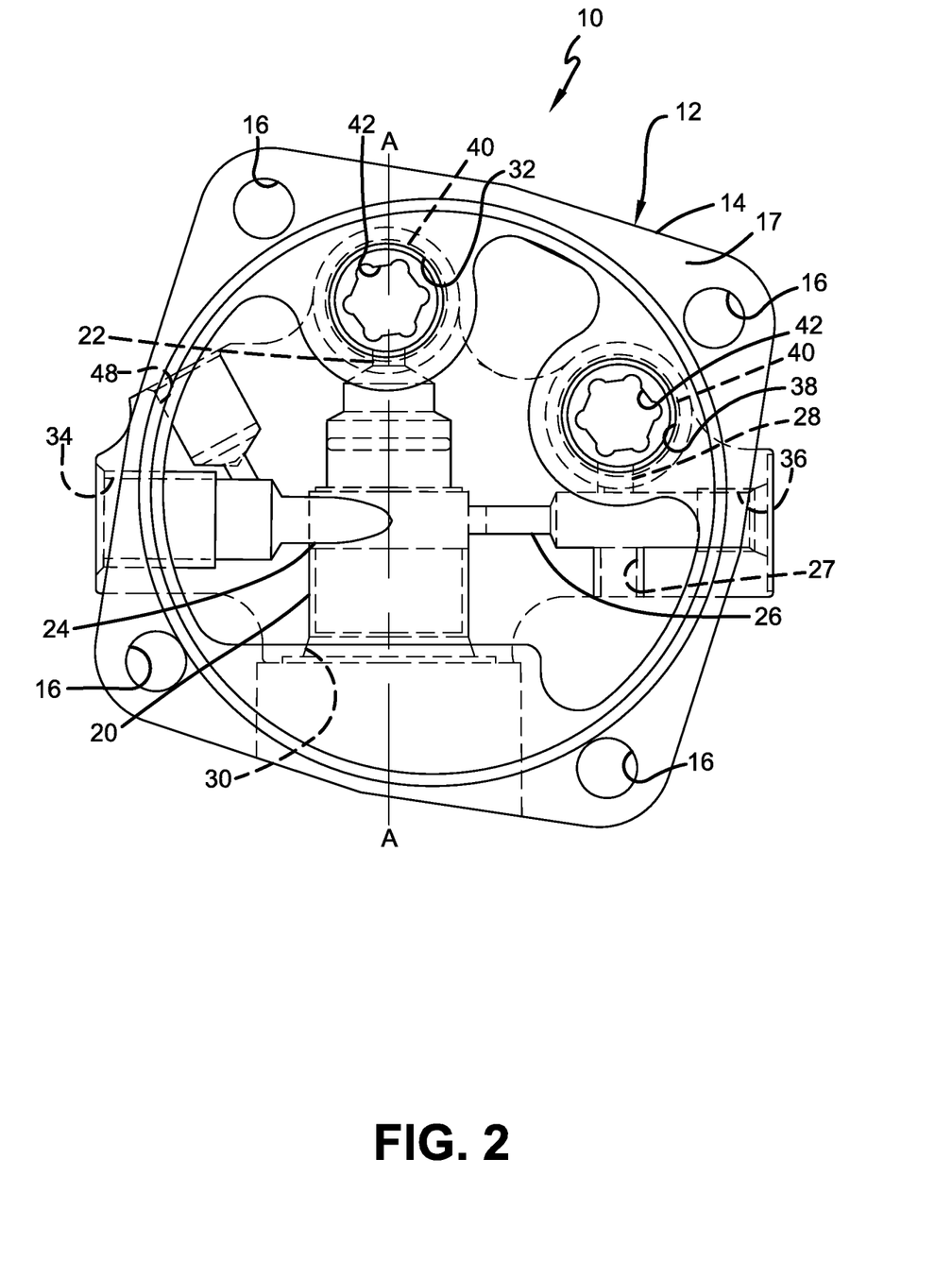
FIG. 2 is a rear elevational view, with hidden portions shown in broken lines, of the hydraulic pressure-step adjustment block shown in FIG. 1.
Figure 3:
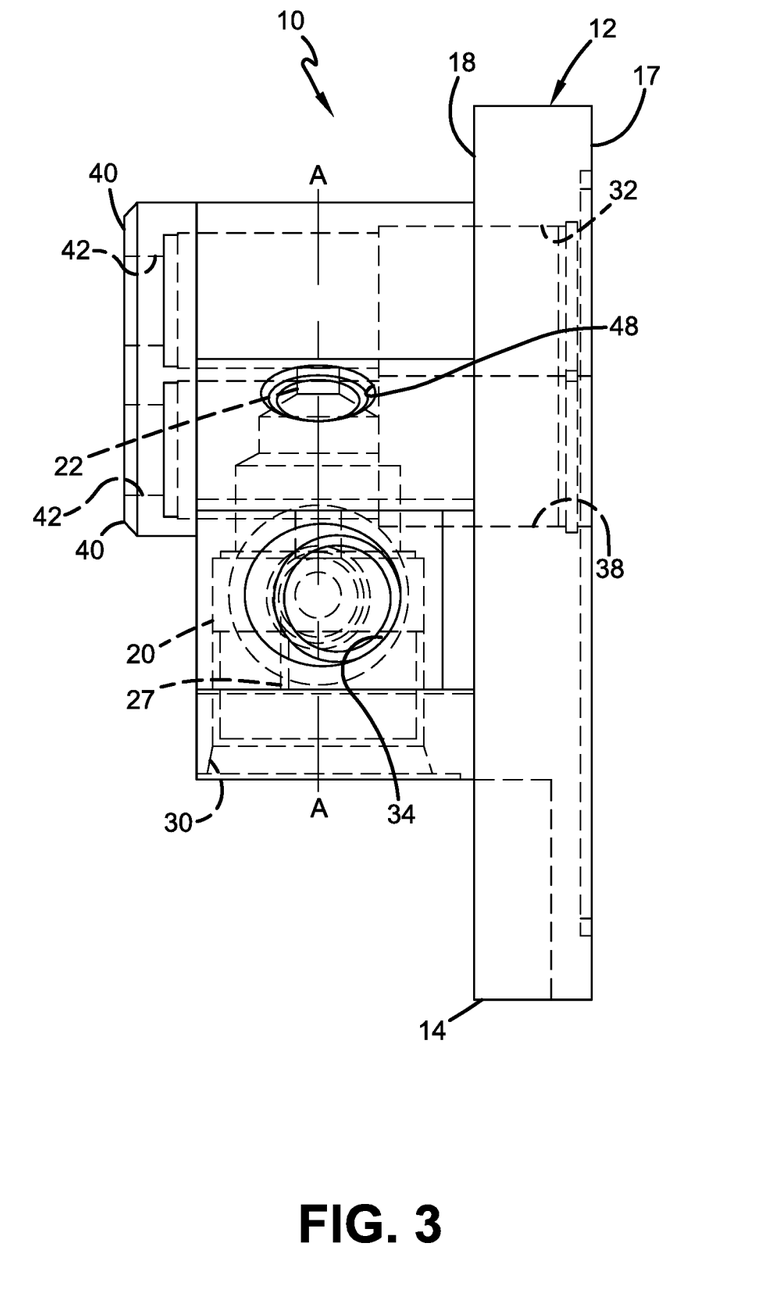
FIG. 3 is a right-side elevational view, with hidden portions shown in broken lines, of the hydraulic pressure-step adjustment block shown in FIGS. 1 and 2.
Figure 4:
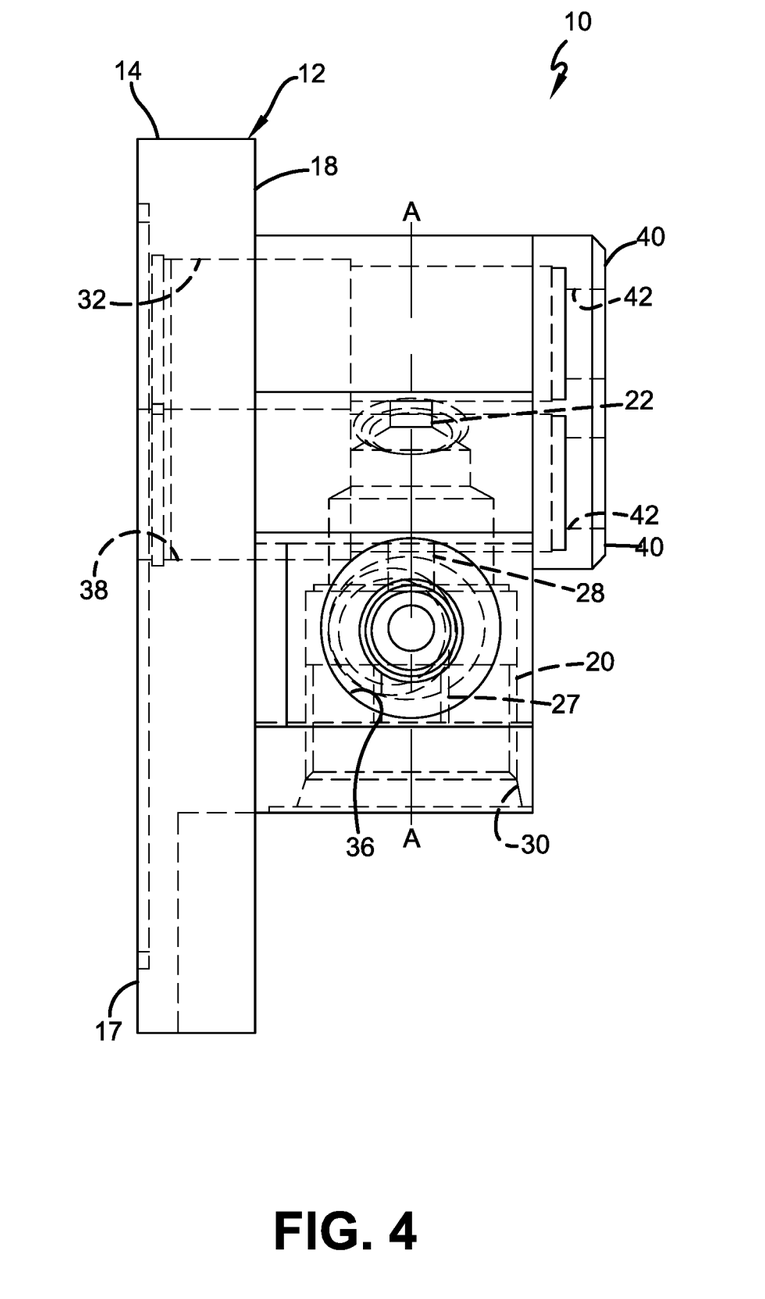
FIG. 4 is left-side elevational view, with hidden portions shown in broken lines, of the hydraulic pressure-step adjustment block shown in FIGS. 1-3.
Figure 5:
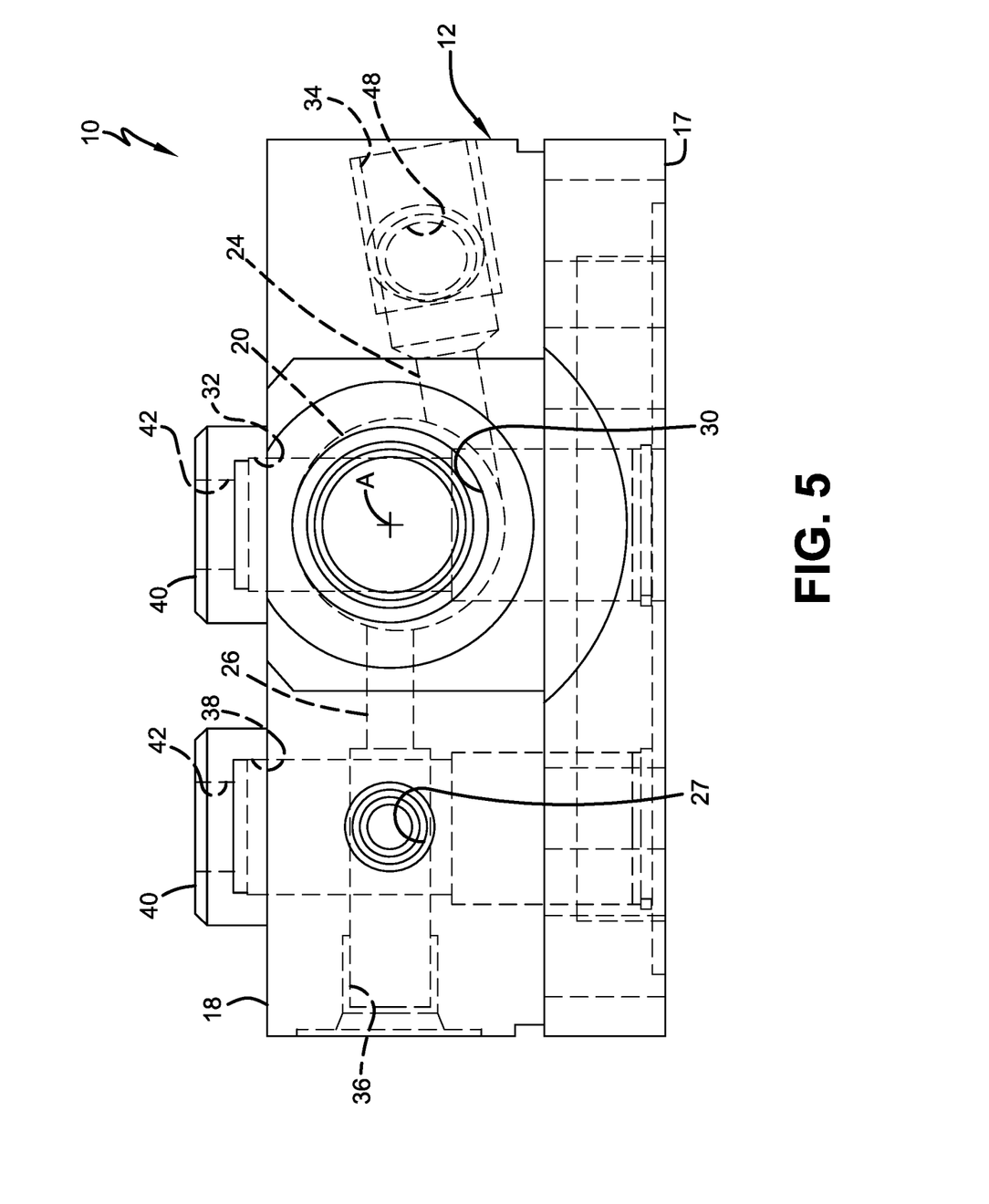
FIG. 5 is a bottom view, with hidden portions shown in broken lines, of the hydraulic pressure step adjustment block shown in FIGS. 1-4 with the relief assembly removed.
Figure 6:
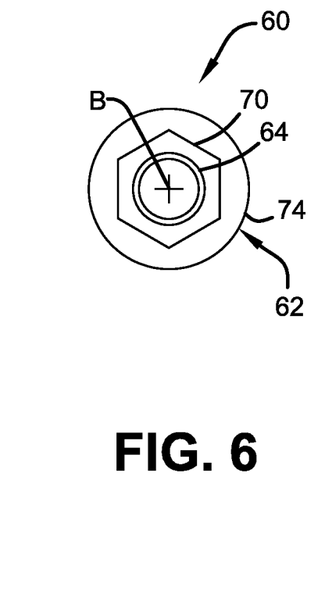
FIG. 6 is a top view of the hydraulic pressure step-adjustment mechanism of the present invention, with the actuator knob removed.
Figure 7:
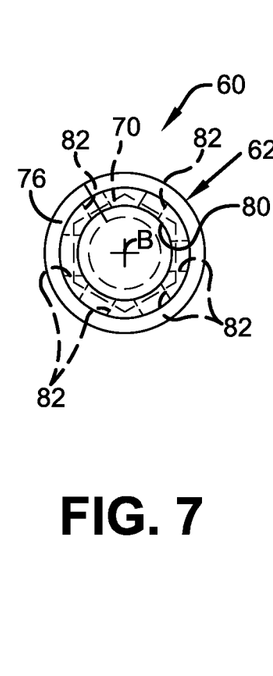
FIG. 7 is a bottom view, with hidden portions shown in broken lines, of the hydraulic pressure step-adjustment mechanism of the present invention shown in FIG. 6.
Figure 8:
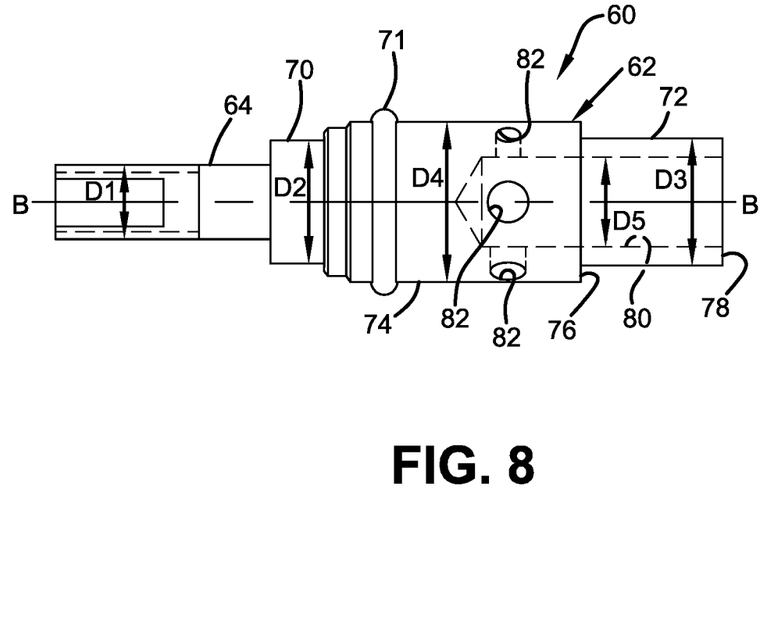
FIG. 8 is an elevational view, with hidden portions shown in broken lines, of the hydraulic pressure step-adjustment mechanism of the present invention shown in FIGS. 6 and 7.
Figure 9:
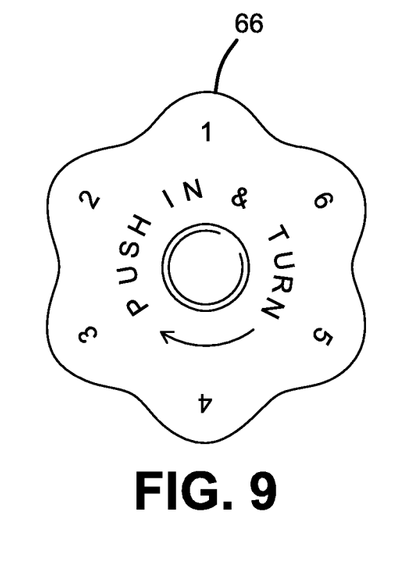
FIG. 9 is a top view of the actuator knob for the hydraulic pressure step-adjustment mechanism of the present invention.
Figure 10:
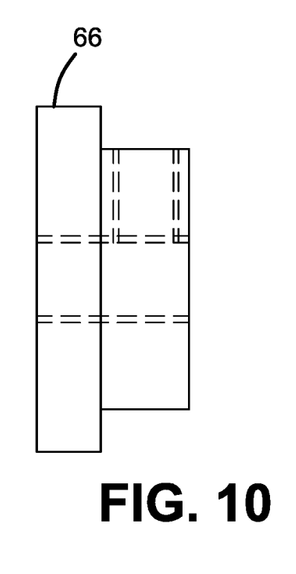
FIG. 10 is an elevational view, with hidden portions shown in broken lines, of the actuator knob shown in FIG. 9.
Figure 11:
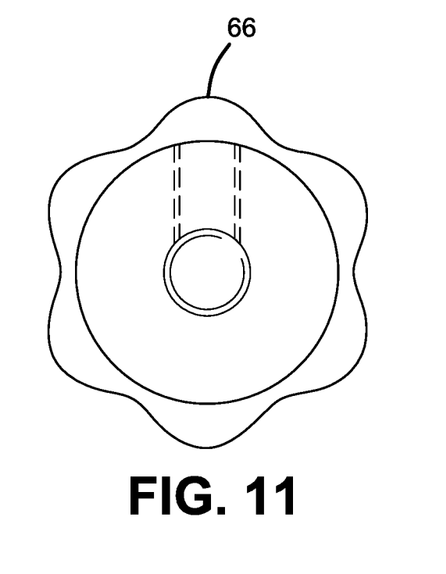
FIG. 11 is a bottom view, with hidden portions shown in broken lines, of the actuator knob shown in FIGS. 9 and 10.

With additional reference to FIGS. 6-8, and in accordance with an important aspect of the present invention, each of the first and second adjustment ports 32, 38, respectively, include respective exemplary embodiment pressure step-adjustment mechanisms 60 disposed therein. Pressure step-adjustment mechanism 60 is formed from any suitable rigid material, such as aluminum or steel, by any suitable process, such as milling, casting, or the like. Pressure step-adjustment mechanism 60 includes a valve portion 62, a stem 64, and a longitudinal central axis B. Valve portion 62 is generally cylindrical and includes a locking section 70. Stem 64 is integrally formed with valve portion 62 and has a generally cylindrical shape that extends from locking section 70 and is centered about longitudinal central axis B. An actuator knob 66 or handle (FIGS. 9-11) may be removably engaged with stem 64 to allow an operator to manipulate pressure step-adjustment mechanism 60. Stem 64 has an outer dimension D1 that is generally less than an outer dimension D2 of locking section 70.

Locking section 70 has a generally hexagonal shape but may have any suitable shape, including rhomboid, circular, or ovoid. Locking section 70 interacts, mates, and/or engages with body 12 of pressure step-adjustment block 10. In particular, each pressure step-adjustment mechanism 60 is inserted into a respective one of the first and second adjustment ports 32, 38 from the transmission-facing side 17 (FIG. 2) of body 12. More particularly, exterior-facing side 18 of body 12 includes respective adjustment port covers or adjustment mechanism locks 40 formed about or over each of first and second adjustment ports 32, 38, respectively. Adjustment mechanism locks 40 include a stem opening 42 through which stem 64 passes. However, stem openings 42 are shaped such that locking section 70 is prevented from passing therethrough. In addition, an interior surface (not shown) of adjustment mechanism locks 40 have a shape corresponding to the shape of locking section 70 of valve portion 62. Locking section 70 matingly engages the interior surface of adjustment mechanism lock 40. As a result, when pressure step-adjustment mechanism 60 has locking section 70 seated in adjustment mechanism lock 40 and matingly engaged with the interior surface, the pressure step-adjustment mechanism cannot be rotated within respective adjustment port 32, 38.

In accordance with another important aspect of the present invention, valve portion 62 also includes an actuation section 72 and adjustment section 74. Adjustment section 74 is disposed between, and integrally formed with, lock section 70 and actuation section 72. Actuation section 72 has an end surface 78. A rubber O-ring 71 is disposed about valve portion 62 between lock section 70 and adjustment section 74. A cylindrical recess 80 is formed in the interior of step adjustment mechanism 60 from end surface 78 and is centered about longitudinal central axis B. Recess 80 extends through actuation section 72 from end surface 78 and at least partially into adjustment section 74. Recess 80 has an inner dimension D5 that is less than an outer diameter D3 of actuation section. Adjustment section 74 has an outer diameter D4 that is greater than outer dimension D3 of actuation section 72. Thus, actuation section 72 and adjustment section 74 have a concentric cylindrical configuration forming a stepped surface 76. In addition, the outer dimension D3 of actuation section 72 corresponds to an inner dimension of a port (not shown) formed in the opening in the transmission housing.

Actuation section 72 also includes a spring (not shown) disposed about the actuation section. An end of the spring abuts stepped surface 76, which acts as a backstop for the spring. An end of the spring opposite stepped surface 76 abuts a peripheral surface about the port in the transmission housing opening. As a result, when pressure step-adjustment block 10 is attached to the transmission housing, the spring is partially compressed against the peripheral surface of the port, biasing locking section 70 of valve portion 62 against adjustment mechanism lock 40. Actuation section 72 becomes aligned with or partially inserted into the port of the transmission housing opening, such that recess 80 is in fluid communication with the transmission. The spring also allows pressure step-adjustment mechanism 60 to be depressed, further inserting actuation section 72 into the port in the transmission housing opening, and allowing lock section 70 to disengage from adjustment mechanism lock 40. As a result, pressure step-adjustment mechanism 60 is made rotatable within the respective adjustment port 32, 38 while depressing the pressure step-adjustment mechanism. Release of pressure step-adjustment mechanism 60 causes the spring to force valve portion 62 against adjustment mechanism lock 40, such that lock section 70 re-engages the adjustment mechanism lock.

In accordance with another important aspect of the present invention, adjustment section 74 includes one or more openings 82. Openings 82 are formed in a circumferentially-spaced arrangement about adjustment section 74 from the exterior of the adjustment section inwardly to recess 80 perpendicularly to longitudinal central axis B. Thus, openings 82 are in fluid communication with recess 80. Each of the plurality of openings 82 may be of a different size to allow different amounts of fluid flow therethrough. It is also contemplated that the circumferentially-spaced arrangement of openings 82 about adjustment section 74 may include a plug or non-opening. Each of the plurality of openings 82 is formed through adjustment section 74 in a location generally corresponding to a side of the hexagonal shape of lock section 70. A demarcation or index may be made on lock section 70 to reference the size of the respective opening 82 to which that side of the hexagonal shape of the lock section corresponds.

During operation prior to launch of a vehicle, pressure step-adjustment mechanism 60 provides adjustable pressure modulation within pressure step-adjustment block 10 and, thus, the torque converter of the transmission. Fluid pressure within the torque converter builds, exhausting fluid from the turbine-side of the torque converter through the exhaust port. Fluid enters main chamber 20 of pressure step-adjustment block 10 through inlet port 34 pressurizing the pressure step-adjustment block. First valve passage 22 is normally blocked by the pin of normally-actuated solenoid 50, preventing fluid communication between main chamber 20 and adjustment port 32. Fluid also enters relief passage 26 and second valve passage 28 and moves toward first adjustment port 38. Pressure step-adjustment mechanism 60 is disposed within second adjustment port 38, such that lock section 70 is engaged by adjustment mechanism lock 40. Engagement of lock section 70 by adjustment mechanism lock 40 orients one of the plurality of openings 82, such that the opening is fixedly aligned with second valve passage 28. Thus, the size of the selected opening 82 determines the amount of fluid flow allowed through pressure step-adjustment mechanism 60 into the transmission, thereby determining the fluid pressure within pressure step-adjustment block 10 and torque converter. In the event a plug or non-opening is selected, pressure within pressure step-adjustment block 10 is nearly equivalent to that within the torque converter.

Similarly, another pressure step-adjustment mechanism 60 is disposed within first adjustment port 32, such that lock section 70 is engaged by adjustment mechanism lock 40. Engagement of lock section 70 by adjustment mechanism lock 40 orients one of the plurality of openings 82, such that the opening is fixedly aligned with first valve passage 22. Thus, the size of the selected opening 82 determines the amount of fluid flow that may be allowed through pressure step-adjustment mechanism 60 into the transmission, thereby determining the fluid pressure within pressure step-adjustment block 10 and torque converter. Once solenoid 50 is actuated, the pin retracts into housing 52, thereby allowing fluid flow through first valve passage 22 through the selected opening 82 of the respective pressure step-adjustment mechanism 60 and through the pressure step-adjustment mechanism into the transmission. Fluid flow through pressure step-adjustment mechanisms 60 is additive, causing a pressure drop in pressure step-adjustment block 10 and at the turbine side of the torque converter. As a result, the engine of the vehicle can spool faster, and the stall speed of the torque converter is increased.

In the event that the size of opening 82 in either pressure step-adjustment mechanism 60 is selected incorrectly, or in the event that environmental or engine conditions require a different size of the opening, the pressure step-adjustment mechanism 60 can be easily and quickly adjusted to select a different size for the opening. In particular, actuator knob 66 is removably engaged with stem 64 of pressure step-adjustment mechanism 60. Pressure is applied to the knob, overcoming the bias of the spring disposed about actuation section 72 of valve portion 62 of step-adjustment mechanism 60 and causing it to compress, thereby allowing the pressure step-adjustment mechanism to be depressed at least partially into the transmission housing opening. Depression of pressure step-adjustment mechanism 60 disengages lock section 70 from adjustment lock mechanism 40, such that the pressure step-adjustment mechanism is rotatable within the respective adjustment port 32, 38. Pressure step-adjustment mechanism 60 is then rotated about longitudinal central axis B until a differently sized opening 82, as indicated on lock section 70, is aligned with first or second valve passage 22, 28, respectively. Release of actuator knob 66 reduces pressure on stem 64 and, therefore, pressure step-adjustment mechanism 60 and the spring, such that the spring applies pressure against stepped surface 76 and forces lock section 70 to re-engage adjustment lock mechanism 40. Thus, an operator may adjust pressure modulation more easily and safely without specialized tools or exposure to, and removal of, heated engine parts.

Exemplary embodiment pressure step-adjustment mechanism 60 of the present invention overcomes the disadvantages, drawbacks, and limitations associated with prior art pressure relief valves by providing a pressure step-adjustment mechanism that can be easily and quickly rotatably varied to alter the pressure within pressure step-adjustment block 10 and the torque converter without exchanging or replacing parts and without exposure to dangerous conditions.

It is contemplated that exemplary embodiment pressure step-adjustment mechanism 60 of the present invention could be utilized on any vehicles, such as cars, trucks, buses, and the like, without changing the overall concept or operation of the present invention. It is also contemplated that exemplary embodiment pressure step-adjustment mechanism 60 of the present invention could be utilized on all types of transmissions utilizing torque converters, including automatic transmissions and manual transmissions with converter drives or other drive systems, such as linko drives, tie drives or bruno drives [Is this correct?], without changing the overall concept or operation of the present invention. It is further contemplated that exemplary embodiment pressure step-adjustment mechanism 60 of the present invention could be formed from various materials, including composites, metal and the like, without changing the overall concept or operation of the present invention.

It is contemplated that pressure step-adjustment block 10 may include only a single or any number of exemplary embodiment pressure step-adjustment mechanisms 60 of the present invention with or without corresponding solenoid valves. It is also contemplated that pressure step-adjustment block 10 may not be directly attached to the transmission housing and may instead be located away from or remotely of the transmission. It is further contemplated that locking section 70 of the exemplary embodiment pressure step-adjustment mechanism 60 and adjustment port covers 40 may be any suitable shape. It is even contemplated that openings 82 of exemplary embodiment pressure step-adjustment mechanism 60 could be formed in different locations along or about valve portion 62 without changing the overall concept or operation of the present invention. It is contemplated that any number of openings 82 from a pair of openings to multiple openings may be formed in adjustment section 74 of valve portion 62 without changing the overall concept or operation of the present invention.

Accordingly, the hydraulic pressure step-adjustment mechanism 60 of the present invention is simplified; provides an effective, safe, inexpensive, and efficient structure and method which achieves all the enumerated objectives; provides for eliminating difficulties encountered with prior art output valves; and solves problems and obtains new results in the art.

In the foregoing description, certain terms have been used for brevity, clarity, and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described. Potential modifications and alterations will occur to others upon a reading and understanding of this disclosure, and it is understood that the invention includes all such modifications, alterations, and equivalents thereof.

Having now described the features, discoveries, and principles of the invention; the manner in which the hydraulic pressure step-adjustment mechanism is used and installed; the characteristics of the construction, arrangement, and method steps; and the advantageous, new and useful results obtained, the new and useful structures, devices, elements, arrangements, process, parts, and combinations are set forth in the appended claims.

What is claimed is:

1. A step-adjustment mechanism of a hydraulic pressure adjustment block for use with a transmission, said step-adjustment mechanism comprising:
    at least one opening, said at least one opening being in fluid communication with said transmission and a torque converter, said step-adjustment mechanism having at least a first position and a second position to selectively restrict fluid flow between the transmission and the torque converter via said at least one opening;
    a valve portion disposed in said hydraulic pressure adjustment block; and
    a locking section, the step-adjustment mechanism being selectively actuable between a first lock position, wherein said locking section is engaged with the hydraulic pressure adjustment block, and a second lock position, wherein the locking section is disengaged from the hydraulic pressure adjustment block, the locking section being engaged with the hydraulic pressure adjustment block to prevent axial rotation of the valve portion when the step-adjustment mechanism is in the first lock position, the valve portion being slidably disposed at least partially within a port of the transmission and freely rotatable when the step-adjustment mechanism is in the second lock position.

2. The step-adjustment mechanism of claim 1, said valve portion having a longitudinal central axis.

3. The step-adjustment mechanism of claim 2, said valve portion having a second opening formed perpendicular to said longitudinal central axis and in fluid communication with said torque converter;
    said at least one opening being formed in said valve portion concentrically along the longitudinal central axis and in fluid communication with said second opening and said transmission.

4. The step-adjustment mechanism of claim 3, said locking section being complementarily-shaped to said hydraulic pressure adjustment block.

5. The step-adjustment mechanism of claim 1, said hydraulic pressure adjustment block comprising a plurality of said step-adjustment mechanisms.

6. The step-adjustment mechanism of claim 1, said valve portion further comprising a spring, said step-adjustment mechanism being biased to said first lock position by said spring.

7. The step-adjustment mechanism of claim 4, said locking section having a geometric shape, said second opening being spaced an axial distance from said locking section and axially parallel to a face of said geometric shape.

8. The step-adjustment mechanism of claim 1, said at least one opening further comprising a plurality of openings.

9. The step-adjustment mechanism of claim 8, each of said plurality of openings having a different diameter and being selectable among a plurality of positions by rotating said valve portion.

10. The step-adjustment mechanism of claim 1, said hydraulic pressure adjustment block being in fluid communication with said torque converter and said transmission.

11. The step-adjustment mechanism of claim 1, said hydraulic pressure adjustment block further comprising a pressure relief assembly responsive to a predetermined fluid pressure within the hydraulic pressure adjustment block.

12. The step-adjustment mechanism of claim 1, said step-adjustment mechanism further comprising a stem portion, said stem portion being configured to receive a removable knob.

13. A step-adjustment mechanism of a hydraulic pressure adjustment block for use with a transmission, said step-adjustment mechanism comprising:
    at least one opening, said at least one opening being in fluid communication with said transmission and a torque converter, said step-adjustment mechanism having at least a first position and a second position to selectively restrict fluid flow between the transmission and the torque converter via said at least one opening;
    a valve portion disposed in said hydraulic pressure adjustment block and having a longitudinal central axis, said valve portion having a second opening formed perpendicular to said longitudinal central axis and in fluid communication with the torque converter, the at least one opening of the step-adjustment mechanism being formed in the valve portion concentrically along the longitudinal central axis and in fluid communication with said second opening and the transmission; and
    a locking section, at least a portion of said locking section being complementarily-shaped to the hydraulic pressure adjustment block, the step-adjustment mechanism being selectively actuable between a first lock position, wherein said locking section is engaged with the hydraulic pressure adjustment block, and a second lock position, wherein the locking section is disengaged from the hydraulic pressure adjustment block, the locking section being engaged with the hydraulic pressure adjustment block to prevent axial rotation of the valve portion when the step-adjustment mechanism is in the first lock position, the valve portion being slidably disposed at least partially within a port of the transmission and freely rotatable when the step-adjustment mechanism is in the second lock position.

14. A step-adjustment mechanism of a hydraulic pressure adjustment block for use with a transmission, said step-adjustment mechanism comprising:

at least one opening, said at least one opening being in fluid communication with said transmission and a torque converter, said step-adjustment mechanism having at least a first position and a second position to selectively restrict fluid flow between the transmission and the torque converter via said at least one opening;

a valve portion disposed in said hydraulic pressure adjustment block and having a longitudinal central axis, the valve portion having a second opening formed perpendicular to said longitudinal central axis and in fluid communication with the torque converter;

the at least one opening being formed in the valve portion concentrically along the longitudinal central axis and in fluid communication with said second opening and the transmission;

a locking section, at least a portion of said locking section being complementarily-shaped to the hydraulic pressure adjustment block, the locking section having a geometric shape, the second opening being spaced an axial distance from the locking section and axially parallel to a face of said geometric shape.

* * * * *